United States Patent [19]
Kauer, Jr. et al.

[11] 3,778,967
[45] Dec. 18, 1973

[54] APPARATUS AND PROCESS FOR THE FRACTIONATION BY THE ADSORPTION OF A COMPRESSED GAS

[75] Inventors: George C. Kauer, Jr., Plainview, L.I.; Louis E. Brooks, Great Neck, L.I., both of N.Y.

[73] Assignee: Air Techniques Incorporated, New Hyde Park, N.Y.

[22] Filed: Jan. 18, 1971

[21] Appl. No.: 107,028

[52] U.S. Cl............................ 55/21, 55/33, 55/163
[51] Int. Cl............................................. B01d 53/04
[58] Field of Search ................... 55/21, 33, 62, 162, 55/163

[56] References Cited
UNITED STATES PATENTS

| | | | |
|---|---|---|---|
| 3,472,000 | 10/1969 | Glass et al. | 55/163 |
| 3,399,510 | 9/1968 | Kauer, Jr. et al. | 55/163 |
| 3,486,303 | 12/1969 | Glass et al. | 55/162 |
| 2,584,889 | 2/1952 | Latour | 55/33 |
| 3,225,517 | 12/1965 | Wachsmuth | 55/33 |

Primary Examiner—Charles N. Hart
Attorney—Marn & Jangarathis

[57] ABSTRACT

A system and apparatus for effecting the adsorption of a component of a compressed gas wherein compressed gas is continuously available to the user equipment. The compressed gas is passed through a valve assembly and after being subjected to adsorption in a tower is divided with a portion being passed to a storage tank for user equipment supply. Another portion is passed to a purge tank for subsequent regeneration of the adsorbent. Upon reaching a predetermined pressure in the storage tank, a control device associated with the storage tank arrests the flow of compressed gas from the compressor to the adsorption tower maintaining, however, the compressor and storage tank in fluid communication. Simultaneously, the purge tank is placed in fluid communication with the atmosphere through the adsorption tower by the valve assembly, to permit the compressed gas therein to flow through the adsorption tower under conditions to regenerate the adsorption material. The compressor is directly or indirectly in fluid communication with the storage tank under any condition of valve assembly configuration.

12 Claims, 9 Drawing Figures

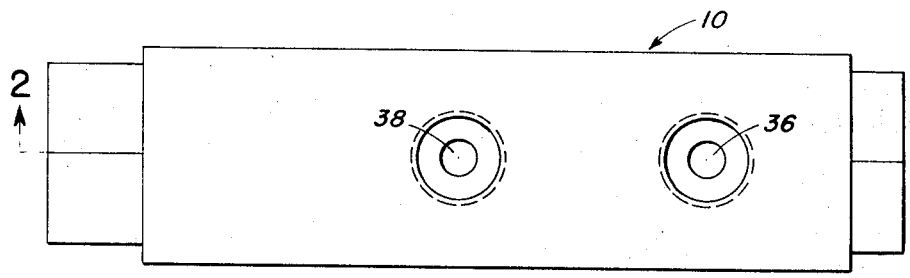
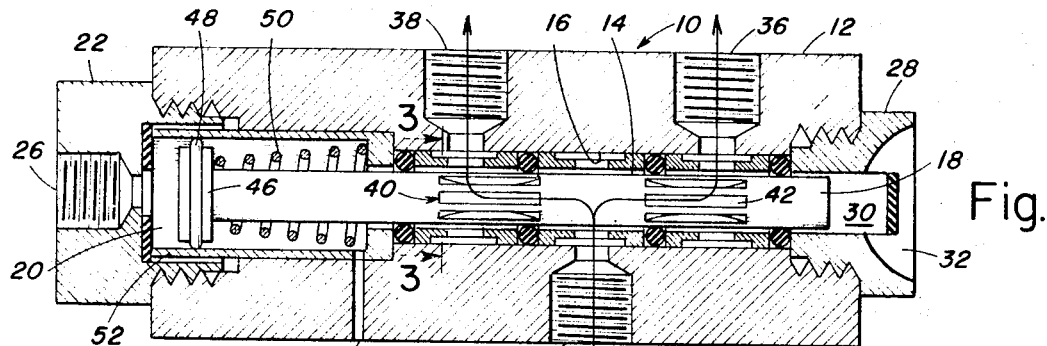
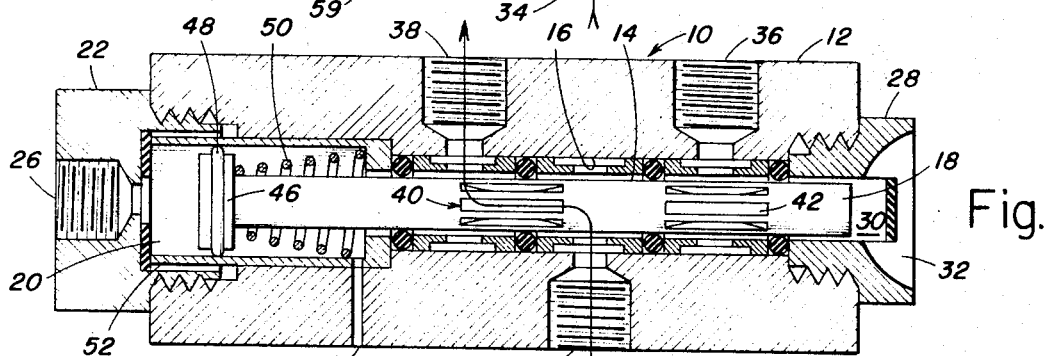
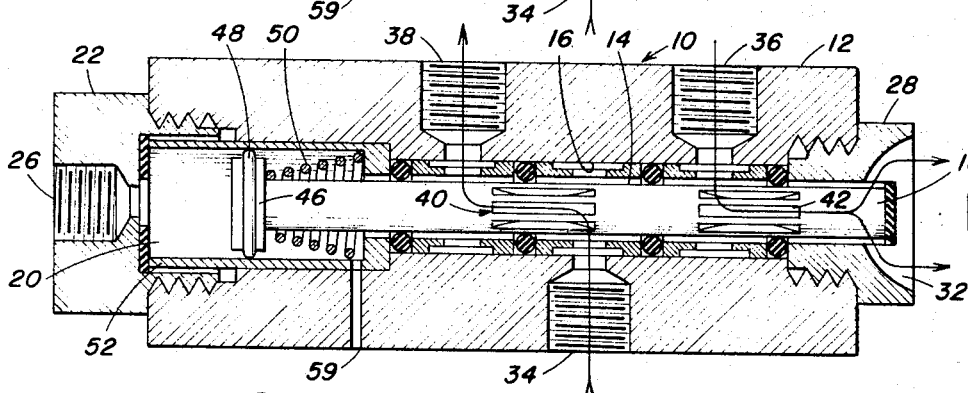
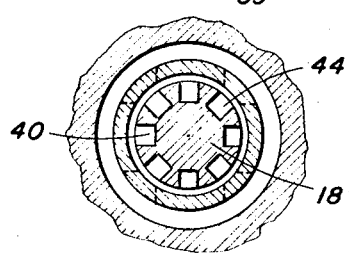

INVENTORS
George C. Kauer, Jr.
Louis E. Brooks
BY
Marn & Jangarathis
ATTORNEYS

APPARATUS AND PROCESS FOR THE FRACTIONATION BY THE ADSORPTION OF A COMPRESSED GAS

BACKGROUND OF THE INVENTION

This invention relates to a valve assembly for the fractionation by adsorption of a compressed gas, and more particularly to a new and improved apparatus and process for the fractionation of a compressed gas whereby user equipment associated therewith is insured of a supply of compressed gas.

Compressed air systems, such as for braking equipment associated with trains, trucks and the like, are known in the art. It is further known that a portion of water vapor in air may condense upon compression of the air and may accelerate deterioration of braking equipment thereby resulting in costly vehicle breakdown due to a shortening of component life expectancy. Additionally, under low temperature conditions, user equipment may become inoperative due to ice formation. Excessive water accumulation in the storage tank reduces the volume of air stored which effects braking performance and vehicle safety under repeated braking operations. It is desirable to reduce the water content of compressed air as well as other foreign material for such compressed air systems, under conditions preventing an interruption in availability of compressed air to the user equipment.

OBJECTS OF THE INVENTION

Accordingly, it is an object of this invention to provide a new and improved process and apparatus for adsorbing a component of a gas whereby user equipment associated therewith is insured of a supply of compressed gas.

Another object of this invention is to provide a new and improved process and apparatus for drying compressed air for user equipment employing compressed air, such as brake assemblies for trains, trucks and the like, under conditions such that the user equipment is insured of a supply of compressed air under upset conditions.

Still another object of this invention is to provide a novel valve assembly for use in a novel apparatus and process for adsorbing a component of a compressed gas.

A further object of this invention is to provide a novel valve assembly for use in a novel apparatus for drying compressed air.

These and other objects of the invention are broadly accomplished by providing a valve assembly having an inlet port in fluid communication with a source of compressed gas, and outlet ports in fluid communication with an adsorption chamber and a storage tank under conditions such that the source of compressed gas is directly or indirectly in fluid communication with the storage tank.

BRIEF DESCRIPTION OF THE INVENTION

In accordance with one embodiment of the invention, the compressed gas is passed via a valve assembly through an adsorption chamber including a suitable adsorbent with a portion being introduced into a storage tank. Another portion of the dried and compressed gas is passed to a purge storage tank for subsequent use. Upon reaching a desired pressurization level in the storage tank, a control device causes an alteration in the valve assembly configuration to place the purge storage tank in fluid communication with the atmosphere through the adsorption tank to permit the gas therein, after a reduction in pressure to regenerate the adsorbent. Simultaneously, the compressor is vented to the atmosphere. The system will maintain such mode until the pressure in the storage tank drops below a predetermined level, at which point the control device will cause the unloader valve to close with a concomitant alteration in the valve assembly configuration to permit the compressed gas to flow therethrough and repeat the adsorbing cycle as hereinabove described. Should the valve assembly become inoperative in any configuration, the compressor is always in fluid communication through the valve assembly directly or indirectly with the storage tank to insure a supply of compressed gas for the user equipment.

The invention will become more readily apparent from the following description when taken with the accompaning drawings wherein:

DESCRIPTION OF THE DRAWINGS

FIG. 1 is an elevational top view of the valve assembly of the invention;

FIG. 2 is a cross-sectional view of the valve assembly taken along the lines 2—2 of FIG. 1 illustrating the valve assembly in an intermediate position;

FIG. 3 is a partial cross-sectional view of the valve assembly taken along the lines 3—3 of FIG. 2 illustrating the valve spindle thereof;

FIG. 4 is a cross-sectional view of the valve assembly taken along the line 2—2 of FIG. 1 illustrating the assembly in a still another intermediate position;

FIG. 5 is a cross-sectional view of the valve assembly taken along the line 2—2 of FIG. 1 illustrating the assembly in a fully pressurized mode with fluid communication being provided for adsorbent regeneration;

Figure 6:
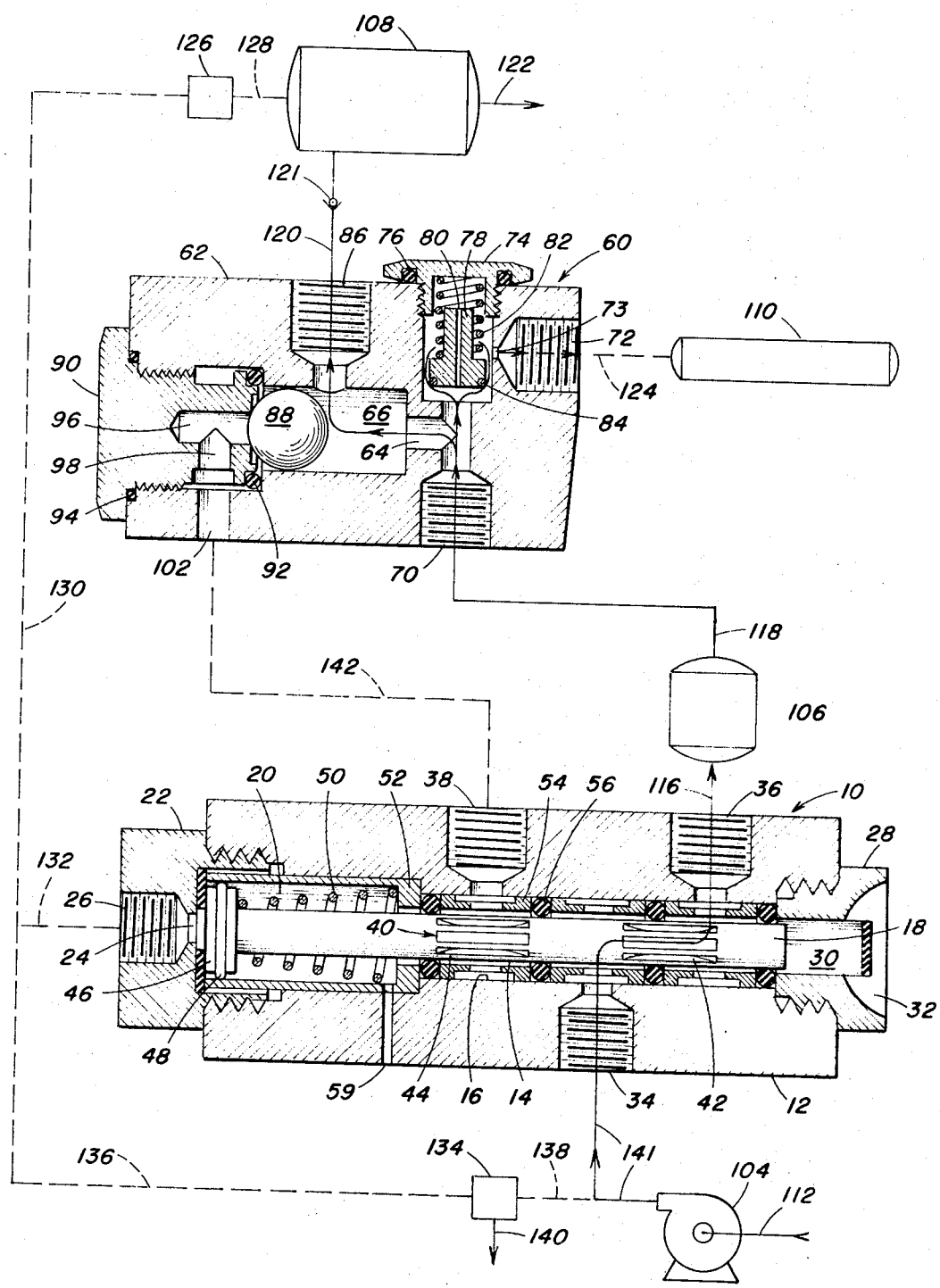
FIG. 6 is a simplified schematic flow diagram of apparatus and process for the fractionation by adsorption of a component of a compressed gas wherein user equipment is insured of a supply of the compressed gas.

The dotted lines in the Figures with reference to the valve assemblies represent the flow pattern of the gas therethrough in various configurations thereof.

DETAILED DESCRIPTION OF THE INVENTION

The invention is particularly applicable to the dehydration of compressed air and therefore the specific embodiment is described with reference to such an operation. It is to be understood, however, that the invention is equally applicable to fractionation by adsorption of other gaseous mixtures where user equipment must be insured of a supply of the compressed gas.

Referring now to FIGS. 1 to 5, there is provided a valve assembly, generally indicated as 10, comprised of a housing 12 having an orifice 14 centrally formed therein by a cylindrical inner wall 16; and a cylindrically-shaped spindle or spool 18 slidably positioned within the orifice 14 of the housing 12. The housing 12 is formed at one end with a cylindrically-shaped chamber 20 in coaxial alignment with the orifice 14 and having a cross-sectional area larger than that of the orifice 14. The chamber 20 of the housing 12 is enclosed by an end member 22 suitably threaded in the housing 12 and provided with a cylindrically-shaped orifice 24 in coaxial alignment with the chamber 20. The orifice 24 of the end member 22 is in fluid communication with a threaded port 26 of the end member 22. The other end of the housing 12 is provided with an end member 28 suitably threaded in the housing 12 and enclosing the orifice 14 of the valve assembly 10. The end member 28 is formed with a cylindrically-shaped orifice 30 in coaxial alignment with the orifice 14 and slightly larger than the cross-sectional area of the spindle 18 to permit the spindle 18 to move into the orifice 30. The outer side of the end member 28 is provided with a slot 32 of a depth sufficient to provide fluid communication between the orifice 30 and the slot 32 of the end member 28. The housing 12 is provided with a plurality of threaded ports 34, 36 and 38 in fluid communication with the orifice 14, as more fully hereinafter described.

Intermediate the ends of the spindle 18, there are provided fluid communication sections, generally indicated as 40 and 42, formed by a plurality of circumferentially-spaced slots 44 in the spindle 18 as illustrated in FIG. 3. A disc-shaped end member 46 having an O-ring 48 mounted therearound is affixed to the end of the spindle 18, such as by threaded engagement. A spring 50 is disposed within a cylindrically-shaped insert 52 positioned in the chamber 20 of the housing 12 and the inner surface of disc member 46 of the spindle 18 to bias the spindle 18 in the housing 12, as more fully hereinafter described. Positioned within the orifice 14 of housing housing 12 in juxtaposition to each port thereof are undercut and slotted spacers 54 internally dimensioned to permit the spindle 18 to move slidably therein. O-rings 56 are disposed between spacers 54 and at the ends thereof. The undercut portion of the spacers 54 insures fluid communication from the slots of the spacers to the port therethrough regardless of the alignment between the slots and the ports. A vent 59 is provided in the housing 12 and the insert 52 to permit the spindle 18 to move with little resistance within the orifice 14 as more fully hereinafter described.

Figure 7:
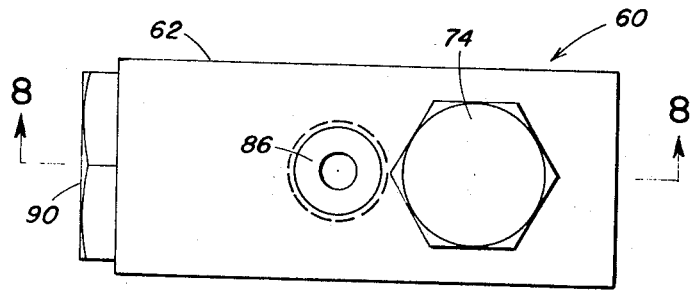
FIG. 7 is an elevational top view of a directional speed control valve for use in the apparatus and process for the fractionation by adsorption of a component of a compressed gas.
Figure 8:
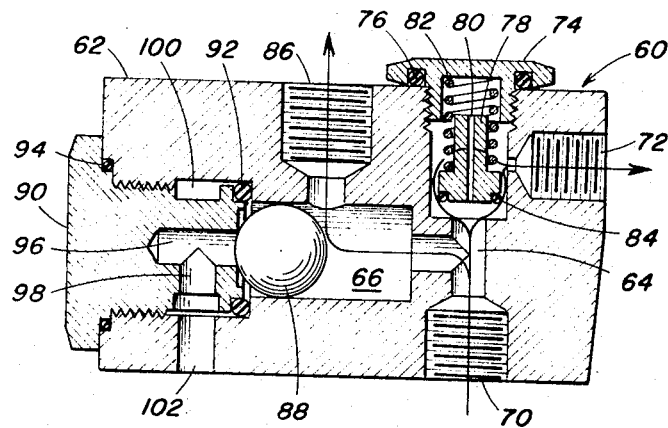
FIG. 8 is a cross-sectional view of the directional speed control valve taken along the lines 8—8 of FIG. 7 illustrating the internal configuration thereof during the adsorption.

Referring now to FIGS. 7 and 8, there is provided a directional speed control valve, generally indicated as 60, comprised of a housing 62 having a T-shaped orifice 64 in fluid communication with cylindrically-shaped chambers 66 and 68. The receiving leg of the orifice 64 is in fluid communication with a threaded port 70. The chamber 68 is in fluid communication with a threaded port 72 via a control orifice 73 and is enclosed by a plug 74 including an O-ring 76 suitably threaded into the chamber 68 of the valve 60. Within chamber 68 there is provided a fluid diverter member 78 having a control orifice 80 and biased by a spring 82 positioned within the chamber 68 in contact with the plug 74. An O-ring 84 is provided on the end of the fluid diverter member 78 adjacent the orifice 64.

The chamber 66 is in fluid communication with a threaded port 86 and is provided with a flow diverting element 88, in the form of a ball. The end of the chamber 66 of the housing 60 opposite the orifice 64 is enclosed by a plug 90 suitably threaded into the housing 62 with O-rings 92 and 94 being provided to seal the chamber 66. The plug 90 is provided with a central orifice 96 in fluid communication with a side orifice 98 forming a 90° angle with the central orifice 96. A portion of the plug 90 adjacent the orifice 98 is circumferentially undercut to form a cylindrical chamber 100 to insure fluid communication between orifice 96 and the port 102 of the housing 62 regardless of the alignment of the port 102 with the orifice 98.

Referring now to FIG. 6, the system for dehydrating compressed air includes, as principal elements, a compressor 104, the valve assembly 10, a drying tank or chamber 106 containing a suitable adsorbent, the direction speed control valve 60, a storage tank or reservoir 108, and a purge tank 110. The process illustrated in FIG. 6 will be described with the spindle 18 of the valve assembly 10 being in the position illustrated therein, and the system in a start-up mode; i.e., compressing air and the storage thereof in storage tank 108. It will be understood that the conduits will be connected to the elements of process in accordance with established techniques.

Air in line 112 is admitted into compressor 104 wherein the air is raised to a desired pressure level. Compressed air is passed from compressor 104 through line 141 to port 34 of the valve assembly 10. The spindle 18 of the valve assembly 10 is maintained in position illustrated in FIG. 6 by the action of spring 50 disposed in the chamber 20. The port 26 of end member 22 of the valve assembly 10 is connected to the storage tank 108, as more fully hereinafter described. The compressed air is passed to port 36 of the valve 10 through respective spacers 54 and fluid section 42 formed in the spindle 18 by the slots 44, and is introduced through line 116 into drying chamber 106 containing a suitable adsorbent (not shown). The choice of adsorbent material will be determined by particular vapor to be removed from the primary gas stream. Suitable adsorbents include, inter alia, silica gel, activated alumina, sorbeads and molecular sieves.

The compressed air is dried in chamber 106 and is passed through line 118 to port 70 of directional speed control valve 60 and divided in orifice 64 into two streams. One portion is passed through chamber 66 of the valve 60 to storage tank 108 via conduit 120 under the control of check vlave 121 from port 86 of the valve 60. A line 122 connected to storage tank 108 supplies compressed air to the user equipment (not shown), such as brake assemblies for trains, trucks and the like. Another portion of the compressed air is passed through chamber 68 via control orifice 73 to port 72 and thence to purge tank 110 by line 124. The orifice 73 controls the rate at which compressed air is introduced into purge tank 110. The pressure of the compressed gas is greater than the compressibility of the spring 82 of the valve 60 which causes the fluid diverter member 78 in the chamber 68 to assume the position illustrated in FIG. 6 as well as in FIG. 8.

A governor 126 is connected by line 128 to storage tank 108 and responds to a preselected maximum pressure in storage tank 108. The governor 126 is connected to the valve assembly 10 by lines 130 and 132, and to an unloader valve 134 by lines 130 and 136. One port of the unloader valve 134 is connected by line 138 to the compressor discharge in line 114, while another port thereof is opened to the atomsphere via line 140. The broken lines from governor 126 are representative of the operation of the system with desorption of the adsorbent in drying chamber 106, as hereinafter more fully described. The port 38 of the valve assembly 10 is connected by line 142 to port 102 of the directional speed control valve 60.

In operation, the spindle 18 of the valve assembly 10 maintains the position illustrated in FIG. 6 until a pre-selected pressure, such as 100 psig., is reached in storage tank 108 whereupon governor 126 responds and pressurizes line 130 thereby admitting compressed air by line 132 through port 26 into valve 10 while simultaneously activating unloader valve 134 by line 136 thereby venting compressor 104 via line 104. The spindle 18 of the valve assembly 10 is thereby displaced to the right (as shown in the FIGS. 2 to 4) facilitated by vent 59 and reaches the position shown in FIG. 5 for desorption of the adsorbent in drying chamber 106 by the compressed air in purge tank 110 as hereinafter described.

Figure 9:
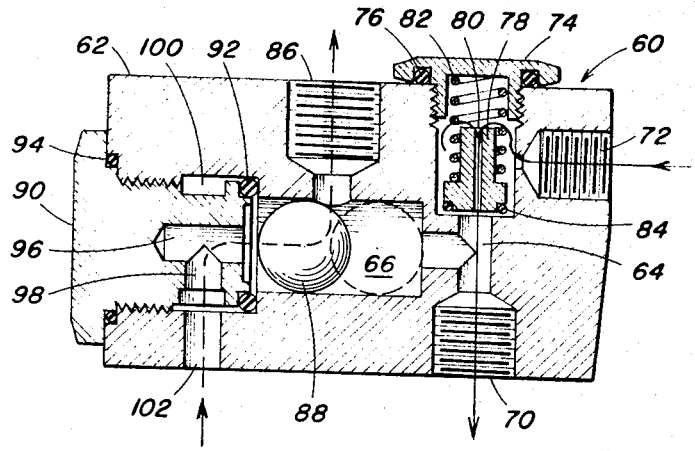
FIG. 9 is a cross-sectional view of the directional speed control valve taken along the lines 8—8 of FIG. 7 illustrating the internal configuration thereof during the regeneration phase of the process.

The compression of the spring 82 causes the fluid diverter member 80 of the valve 60 to assume the position illustrated in FIG. 9. Compressed air in the purge tank 110 is passed by line 124 to port 72 and is caused to flow through the control orifice 80 of the fluid diverter member 78 thereby expanding the air. The expanded air is then passed through orifice 64 to port 70 and thence via line 118 to drying tank 106 wherein the expanded dry air re-adsorbs water from the adsorbent in drying chamber 106 during passage therethrough. The water laden air stream is withdrawn from drying tank 106 through line 116 and is passed to port 36 of the valve assembly 10. The port 36 of the valve assembly 10 is in fluid communication with the slot 32 thereof through section 42 thereby permitting the water laden air stream to be vented to the atmosphere.

The spindle 18 of the valve assembly 10 will maintain the position illustrated in FIG. 5 until governor 126 is deactivated which is affected by a reduction in pressure in storage tank 108 (by supply thereof to the user equipment) notwithstanding completion of the reactivation of the adsorbent in drying chamber 106. Deactivation of the governor 126 deactivates the unloader valve 134 and simultaneously reduces the pressure in chamber 20 of the valve assembly 10 (by venting line 132 to the atmosphere) thereby causing the spindle 18 to slide to the position shown in FIG. 6 under the action of spring 50 thereby renewing the initial made for the adsorption of a component of the compressed gas. With the spindle 18 of the valve assembly 10 in the position in FIG. 6, compressed gas in line 114 is now passed through the drying chamber 106 to directional speed control valve 60 from which the compressed gas stream is divided and passed to the storage tank 108 and purge tank 110.

compressed air may pass to storage tank 108 regardless of the configuration of the spindle 18 or the valve 10. With the spindle 18 of the valve 10 in the position illustrated in FIG. 5, it will be noted that port 34 is in fluid communication with port 38 thereof through the section 40 of the spindle 18. Since the discharge pressure of the compressor 104 is selected to coordinate with the operative pressure of governor 126, no compressed air will pass directly to the storage tank 108 during reactivation of drying chamber 106. However, should the pressure in the storage tank 108 drop below a minimum pressure when the spindle 18 position is that shown in any of FIGS. 2, 4 and 5 (i.e., immovable), the governor 126 will deactivate the unloader valve 134 thereby permitting compressed air to pass to storage tank 108 from valve assembly 10 by line 142, control valve 60 and line 120. In this regard the flow diverter element 88 is caused to move to the right and assume the position shown by dotted lines in FIG. 9 wherein the compressed air flows from port 102 to port 86 through orifices 98 and 96 and chamber 66 of the valve 60. It will be noted that under any condition of operations that compressed air is prevented from passing from storage tank 108 to drying chamber 106 by check valve 121 in line 120. Additionally, it will be noted that compressed air in line 142 is prevented from passing to dryer 106 by the fluid diverter element 88 disposed in chamber 66 of the fluid speed control valve 60.

It will be appreciated that during drying, reactivation and the switching therebetween, that the user equipment is insured of a supply of compressed gas (whether dried or not). It will be seen from FIGS. 2 and 4 that in any position of the spindle 18 of the valve 10 between that illustrated in FIGS. 6 to that of FIG. 5, compressed air may pass through valve assembly 10 to storage tank 108. Thus, should the spindle 18 of the valve assembly 10 become immovable (for any reason) within the valve 10 at any position, compressed air will pass to storage tank 108 either indirectly via drying chamber 106, or directly through line 142, valve 60 and line 120. In FIG. 2, the fluid communication subsections 40 and 42 of the spindle 18 permit compressed gas entering port 34 to be divided between ports 36 and 38 leading to drying tank 106 and storage tank 108, respectively. FIG. 4 illustrates an intermediate position of the spindle 18 wherein the total flow of compressed air (undried) is passed directly to the storage tank 108, by-passing drying tank 106. Even if the spindle 18 of the valve assembly 10 became lodged in the position illustrated in FIG. 5 during regeneration of the adsorbent in drying chamber 106, compressed air will pass to storage tank 108 after deactivation of the unloader valve 134.

Thus, the user equipment is not placed in jeopardy of an availability of compressed air other than by a breakdown of the compressor itself. The apparatus and process of the invention results in a "fail safe" system for the supply of user equipment with compressed gas where the continual supply of air is vital.

Numerous modifications and variations of the present invention are possible in view of the above teachings and, therefore, within the scope of the appended claims the invention may be practised other than as particularly described.

What is claimed is:

1. A process for fractionating by adsorption a gaseous mixture of at least two components, comprising:
   a. compressing the gaseous mixture;
   b. passing the compressed gaseous mixture through an adsorbent bed to adsorb one component of the mixture to provide a gaseous stream, the passage being controlled by a first valve means;

c. passing a portion of the compressed gaseous stream from said adsorbent bed to a first storage zone via a second valve means;

d. passing a portion of the compressed gaseous stream from said adsorbent bed to a second storage tank by said second valve means;

e. stopping the flow of said gaseous mixture through said adsorbent bed while continuing the compression of said gaseous mixture;

f. placing the compress or in fluid communication with said first storage zone during regeneration of said adsorbent bed to provide a supply of compressed gaseous mixture to said first storage tank via said valve means should the pressure in said first storage tank drop below a predetermined pressure therein.

2. The process as defined in claim 1 wherein step (d) is initiated in response to a predetermined pressure in said storage zone.

3. The process as defined in claim 2 and further comprising moving said first valve means to switch the fluid communication of the compressed gaseous mixture from said adsorbent bed to said storage zone, said switching of said valve means being effected pneumatically by a portion of the compressed gaseous mixture in said storge zone.

4. The process as defined in claim 1 wherein said second portion of said gaseous mixture is passed through said adsorbent bed at a lower pressure to desorb said one component from said adsorbent bed.

5. The process as defined in claim 4 wherein said gaseous stream resulting from said desorption is passed through the first valve means.

6. The process as defined in claim 1 wherein the gaseous mixture is wet air and said adsorption is effected to dry the air.

7. An apparatus for adsorptive fractionation of a gaseous mixture comprising:

a vessel containing an adsorbent; a compressor for compressing said gaseous mixture; a first valve means; a first conduit means connecting said compressor to said first valve means; a second conduit means connecting said first valve means to said vessel to provide a compressed gas inlet conduit means; a first and second storage tank means; a second valve means; primary outlet means connected to said vessel for passing to said storage tank means unadsorbed portion of the gaseous mixture via said second valve means; a third conduit means connecting said first valve means to said first storage tank means; and a control means operatively connected to said first valve means to operate said first valve means to arrest the flow of said compressed gaseous mixture to said vessel and to place said compressor in fluid communication with said storage tank through said third conduit means via said valve means should the pressure in said first storage tank means drop below a predetermined pressure therein.

8. The apparatus as defined in claim 7 wherein said control means operates in response to the pressure in said storage tank.

9. The apparatus as defined in claim 8 wherein said valve means permits said second unadsorbed portion to flow through said vessel to desorb said one component while simultaneously arresting the flow of said compressed gaseous mixture to said vessel.

10. The apparatus as defined in claim 7 wherein a third valve means responsive to said control means vents said compressed gaseous mixture when the flow to the vessel of the compressed gaseous mixture is arrested.

11. The apparatus as defined in claim 7 wherein said first valve means is a pneumatically operated valve means.

12. The apparatus as defined in claim 7 wherein said control means is a governor valve.

* * * * *